US009697674B2

(12) United States Patent
Morrissette

(10) Patent No.: US 9,697,674 B2
(45) Date of Patent: Jul. 4, 2017

(54) MULTIPLE GAME TOURNAMENT

(71) Applicant: CFPH, LLC, New York, NY (US)

(72) Inventor: Matthew Morrissette, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 114 days.

(21) Appl. No.: 14/472,615

(22) Filed: Aug. 29, 2014

(65) Prior Publication Data

US 2015/0325086 A1 Nov. 12, 2015

Related U.S. Application Data

(60) Provisional application No. 61/991,049, filed on May 9, 2014.

(51) Int. Cl.
*G06F 17/00* (2006.01)
*G07F 17/32* (2006.01)
*G07F 17/34* (2006.01)

(52) U.S. Cl.
CPC .......... *G07F 17/32* (2013.01); *G07F 17/3204* (2013.01); *G07F 17/3239* (2013.01); *G07F 17/3276* (2013.01); *G07F 17/34* (2013.01)

(58) Field of Classification Search
USPC .................................................... 463/16–25
See application file for complete search history.

(56) References Cited

U.S. PATENT DOCUMENTS

| | | | | |
|---|---|---|---|---|
| 6,082,887 | A | 7/2000 | Feuer et al. | |
| 8,702,520 | B2 | 4/2014 | Seelig et al. | |
| 2002/0119824 | A1 | 8/2002 | Allen | |
| 2004/0176157 | A1* | 9/2004 | Walker | G07F 17/32 463/16 |
| 2006/0082056 | A1 | 4/2006 | Kane et al. | |
| 2011/0039610 | A1* | 2/2011 | Baerlocher | 463/12 |
| 2012/0102372 | A1* | 4/2012 | Milan | H04L 12/44 714/56 |
| 2013/0116032 | A1* | 5/2013 | Lutnick | G07F 17/3276 463/17 |
| 2014/0004930 | A1 | 1/2014 | Cannon et al. | |
| 2014/0038724 | A1 | 2/2014 | Layne et al. | |

OTHER PUBLICATIONS

Notification of Transmittal of the International Search Report and the Written Opinion of the International Searching Authority for Application No. PCT/US15/29948 mailed Aug. 7, 2015 (8 pages).

* cited by examiner

*Primary Examiner* — Ronald Laneau
(74) *Attorney, Agent, or Firm* — Mark Miller

(57) ABSTRACT

Players may compete in a tournament that involves multiple different games.

22 Claims, 3 Drawing Sheets

Figure 3
Available game
Available game
Available game
Available game
Tournament properties
Start time
End time
Prize
Buy in
Normalize game weight to
Etc.
Selected game properties
List of possible outcomes to choose which are winners
Adjustable probability of outcomes and/or payout per outcomes
Determined weight based on normalization criteria and outcome data
Add to Tournament button
Enable Tournament button
List of Games in Tournament with weights

MULTIPLE GAME TOURNAMENT

CROSS REFERENCE TO RELATED APPLICATIONS

This application claims the benefit of U.S. Provisional Patent Application Ser. No. 61/991,049, filed on May 9, 2014, which is hereby incorporated by reference herein in its entirety.

FIELD

Some embodiments may generally relate to tournaments.

BACKGROUND

Playing games is a regular part of entertainment for individuals around the world.

SUMMARY

The following should be understood as example embodiments, and not as claims.

A. An apparatus comprising: one or more processors and one or more non-transitory mediums having stored thereon instructions that when executed by the one or more processors cause the apparatus to: determine a plurality of different game types to be available for play in a tournament by a plurality of players; facilitate play of the plurality of different game types by the plurality of players as part of the tournament; track outcomes of the play of the plurality of different game types by the plurality of different players as part of the tournament; based on the tracked outcomes, determine a winning player of the tournament from the plurality of players.

A.1. The apparatus of claim A, in which the plurality of different game types include sports wagering and casino gaming. A.2. The apparatus of claim A, in which tracking outcomes includes: for each winning game played as part of the tournament, receiving an indication of an outcome of the game and determining an amount of an increase in tournament points a player of the plurality of players. A.2.1. The apparatus of claim A.2, in which the amount includes an amount of money won by play of the game. A.2.2. The apparatus of claim A.2, in which determining the amount includes applying a normalization factor to the outcome. A.3. The apparatus of claim A, in which facilitating play includes at least one of: determining outcomes for the plurality of different game types, and adjusting an interface to allow selection of the different game types as part of the tournament. A.4. The apparatus of claim A, in which the apparatus is caused to receive an indication of a player logging in at each of a plurality of gaming devices, and based on each logging in, apply adjustments a score in the tournament from gameplay at the gaming devices to the player. A.4.1. The apparatus of claim A.4, in which the gaming devices include at least one of a slot machine, a mobile phone, and a sports book interface.

A.5. The apparatus of claim A, in which the apparatus is caused to: determine a winner of the tournament includes determining a player of the plurality of players that has a highest point total at an end of the tournament. A.6. The apparatus of claim A, in which determining the game types includes receiving a selection of the game types from an administrator. A.6.1. The apparatus of claim A.6, in which receiving the selection of game types includes receiving a selection of winning outcomes and a chance of each outcome occurring for each game type. A.7. The apparatus of claim A, in which the apparatus is caused to: based on at least one of an expected return on each game type, an expected chance of a winning outcome in each game type, and an average win amount in each game type, determine a normalization factor for each game type, and in which tracking outcomes includes applying a respective normalization factor to each outcome to normalize winnings from each game type.

B. A method comprising: determining, by a computing device, a plurality of different game types to be available for play in a tournament by a plurality of players; facilitating, by the computing device, play of the plurality of different game types by the plurality of players as part of the tournament; tracking, by the computing device, outcomes of the play of the plurality of different game types by the plurality of different players as part of the tournament; based on the tracked outcomes, determining, by the computing device, a winning player of the tournament from the plurality of players.

B.1. The method of claim B, in which the plurality of different game types include sports wagering and casino gaming. B.2. The method of claim B, in which tracking outcomes includes: for each winning game played as part of the tournament, receiving an indication of an outcome of the game and determining an amount of an increase in tournament points a player of the plurality of players. B.2.1. The method of claim B.2, in which the amount includes an amount of money won by play of the game. B.2.2. The method of claim B.2, in which determining the amount includes applying a normalization factor to the outcome. B.3. The method of claim B, in which facilitating play includes at least one of: determining outcomes for the plurality of different game types, and adjusting an interface to allow selection of the different game types as part of the tournament. B.4. The method of claim B, comprising: receiving an indication of a player logging in at each of a plurality of gaming devices, and based on each logging in, applying adjustments a score in the tournament from gameplay at the gaming devices to the player. B.4.1. The method of claim B.4, in which the gaming devices include at least one of a slot machine, a mobile phone, and a sports book interface.

B.5. The method of claim B, comprising: determining a winner of the tournament includes determining a player of the plurality of players that has a highest point total at an end of the tournament. B.6. The method of claim B, in which determining the game types includes receiving a selection of the game types from an administrator. B.6.1. The method of claim B.6, in which receiving the selection of game types includes receiving a selection of winning outcomes and a chance of each outcome occurring for each game type. B.7. The method of claim B, comprising: based on at least one of an expected return on each game type, an expected chance of a winning outcome in each game type, and an average win amount in each game type, determine a normalization factor for each game type, and in which tracking outcomes includes applying a respective normalization factor to each outcome to normalize winnings from each game type.

DETAILED DESCRIPTION

I. Example Embodiments

Some embodiments may allow users to play in a tournament across multiple games of various types. A typical tournament involves a single game. For example, a poker tournament involves the play of multiple hands of poker. However, each hand is the same game: poker. In various embodiments, a tournament may be played involving a variety of different games. For example some games types may include poker, sports wagering, slots, table games, casino games, and so on.

Figure 1:
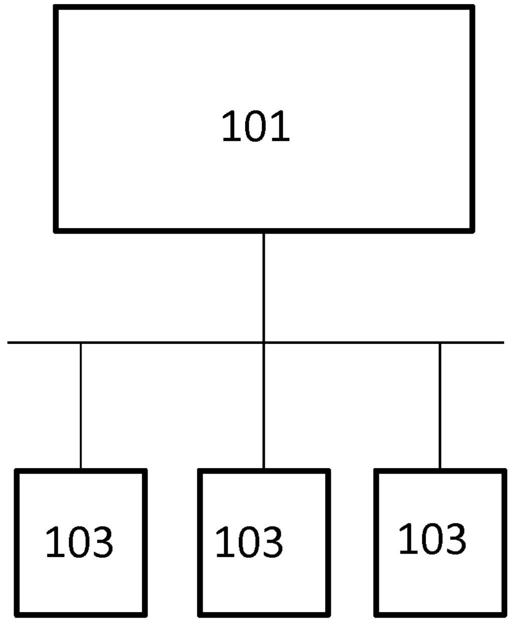
FIG. 1 illustrates an example system that may be used in some embodiments.

FIG. 1 illustrates an example system that may be used in some embodiments. The system may include a central system 101 and any number of gaming systems 103. Each gaming system may allow players to play one or more games. The central system may facilitate and/or track game play through such gaming systems for use in a tournament (e.g., by monitoring play, applying a metric to convert play into tournament generalized results, and tracking progress in a tournament).

Each gaming system 103 may include a computing device configured to allow gameplay by one or more players. In some embodiments, such devices may include devices of a player, such as home computers, mobile phones, tablets, and so on. A player may use such a personal device to log into a gaming system and play games through the system. The play may include a plurality of different games offered by the system. For example, a gaming system may offer users the ability to play card games (e.g., blackjack, poker, baccarat, etc.), slot games, roulette, casino games, video games, sports games, etc.

As another example, gaming systems 103 may include specifically designed gaming devices. Such devices may include, for example, slot machines, a sports wagering interface, electronic table games, and so on. For example, in a casino environment a plurality of gaming devices may be spread around a casino floor. A plurality of such devices may operate to allow players to play games through those devices such as by actuating controls to enter input and providing output of game elements and/or results. Some embodiments may include a combination of such gaming specific devices and personal devices (e.g., some games for a tournament may be played on slot machines and some may be played through iPhones).

Central system 101 may operate to enable, facilitate, and/or track a tournament played by multiple players through multiple gaming devices. A central system may include a computing devices such as a server, a cloud based system, and so on. Some elements of a central system may track winnings, track funding, track play, determine outcomes of games, track outcomes of games, provide auditing abilities, and so on. For example, a central system may maintain an account and balance information. As another example, a central system may maintain leader board information, winning status information and so on. As yet another example, a central system may maintain a database of players in the tournament and the current standing of each player based on play in the tournament. In still another example, a central system may use a random number generation to determine outcomes of games played in the tournament. For example, outcomes of games may be determined by the system 101 and transmitted for display through devices 103. In other embodiment, a gaming device or other element may determine outcomes instead of and/or in addition to the central system. For example, a slot machine 103 may determine the outcome of a slot game. The central system may receive that information and use it as input for a tournament ranking (e.g., an amount of money or points won, a winning or losing outcome itself, etc.).

In some embodiments, device 103 may facilitate a login such as by username and password and/or by card swipe or other token based signing. The signing to the device may cause the device and the server to communicate. A server may host wallet and other account information that may be usable for the tournament. That information may be transmitted to the device in response to the user logging in to the device. When a user adjusts funding information the central service may update that information in a central location. Accordingly, a user may access funds for a tournament at any device and have those funds centrally stored. A user may then access his or her account at another device (e.g., another game device involved in the tournament) by logging into another device.

In some embodiments, a tournament may have a duration. The duration may include a duration based on time and/or a duration based on a number of games. In some embodiments, for example, a duration may include some time amount. Such a time amount may include an hour, fifteen minutes, a day, a weekend, a week, a year, and so on. In some embodiments, games played during the time duration may apply to the tournament.

In some embodiments, the duration may include an amount of games. Games may be weighted differently in a count of games towards a duration and/or may be weighed equally. For example, a slot game may count as one game where a blackjack game may count as two games in some embodiments. Each game may be given a weight, and that weight may be identified to a player in the tournament. The weighting may be based on an amount of potential win, a length of time of a game, an expected value of play, a length of time of a game (e.g., longer games have higher weight), an odds of a game (e.g., better odds have lower weight), a cost per play of a game (e.g., more expensive games have higher weight), and/or any desired factor. For example, longer games and/or games with higher likely or possible payouts may be more weight than games that are short, have lower expected return, and/or have lower possible return. In such a way, the weighting of games may help to even out the expected advantage of players but still allow the player to play their favorite games. Some such embodiments may treat play across games in an approximately equal manner.

In some embodiments, a tournament may require a player to play some number of different games of the plurality of offered game options. A central system may notify a player of such a requirement and may track whether the player meets the requirement. Players that do not meet the requirement may be determined as ineligible by the central system (e.g., ineligible to win the tournament). In such embodiments, players may be prevented from playing a single game only. In some embodiments, players may be required to play each of the offered games at least one time to be eligible to win the tournament. In some embodiments, a player may be limited to the number of times he or she can play each game (e.g., one time, five times, etc.). A player may be required to play the games that number of times or limited to playing that number of times to qualify for the tournament. A player that plays a game more than a maximum number of times may have subsequent plays (i.e., plays subsequent to the maximum numbered play) not counted towards adornment and/or a player may be prevented from playing a game more than a maximum number of times (e.g., a central system may prohibit play). In some embodiments a best or worst rounds may be used if the number of times a game is played more than a maximum number of times.

Some embodiments may include a set time for the tournament. For example, the tournament my take place over an hour from 9 am to 10 am. Games played during that time may qualify. In some embodiments, games may not be weighed or limited in number. Such an embodiment may introduce a speed element to the tournament as players attempt to win as many games as possible in that time.

In some embodiments, a time may be varied but a duration may be set. For example, players may be able to play up to an hour worth of games for the tournament, but that hour may start when they choose (e.g., within some window of availability). In still other examples, the time may not be consecutive, but rather players may play for some duration that cumulatively adds to no more than some duration limitation. A central system may track each player's duration of play to prevent players from going over the duration limitation.

It should be recognized that various combinations of consecutive non-consecutive time limited, game number limited and so on embodiments may be used together as desired. For example, in some embodiments, a player may play for up to one hour in tournament play. That tournament may include a maximum number of rounds of each game that will be counted in the tournament. The player may be required to play a certain number of games. The player may play each game more than the maximum number of rounds, but the tournament may only count the best rounds played that do not exceed the maximum number that are played during the hour time limit.

In some embodiments a player may be provided some funding to use for gameplay in the tournament. The funding may be points, credits, dollars, etc. The funding may be variable based on a buy in amount and/or may be uniform for players in the tournament. In some embodiments, each player may be given the same funding. In other embodiments, player funding may vary based on player buy in. Players may use that funding to play games in the tournament through one or more gaming systems. Players may be allowed to use that funding to play in the tournament. By setting a standard funding level, players may compete on equal footing. In still other embodiments, players may use their own funding (e.g., money, loyalty points, etc.) in the tournament (e.g., up to some amount, any amount, instead of provided founding, in addition to provide funding, etc.).

In some embodiments, players may be able to play with just the allocated funding. In some embodiments players may be allowed to play in the tournament with the allocated funding and funding that is won from use of the allocated funding through play in the tournament. In some embodiments the allocated funding may be limited to use in the tournament. A central system may track and enable use of and winning by use of allocated funding. For example, a database of player winnings and funding may be maintained by a central system.

In other embodiments the allocated funding may be used outside the tournament, the player may use other funding to player in the tournament, and/or other funding mechanism may exist. In some embodiments, allocated funding may be usable for things other than play in the tournament (such as buying drinks or other items).

Various games may be offered as part of the tournament. Examples of those games are given herein and may include single player and/or multiplayer games. Those games may include fixed odds such as slot machine games. Those games may include odds that may vary during the tournament. For example, sports wagers may be offered and those wagers may have odds that change based on the situation (e.g., as a sports book balances risk).

Players may use gaming devices to place wagers on one or more games. The players may choose how to bet, games to play, how much to bet and so on in each of the plurality of games/wagers offered through the tournament facilitated by the central system. Various games or wagers may include fantasy games, contest entry fees, sports bets, games of skill, games of chance, games defined as wagers under UIGEA, games defined as not wagers under UIGEA, and so on.

A determination may be made based on that gaming activity in a tournament as to who wins the tournament. A central system 101 may track such funding, track game play, and determine from that information one or more winners of the tournament. A winner may be a player that accumulates the most winnings at the end of the tournament. Such accumulation may include or exclude an amount of provided and/or purchased funding.

It should be recognized that winnings though each game may be normalized across games in the tournament based on weights assigned to a game. For example, a user may win 100 dollars in a game and that 100 dollars may be weighted by a normalization weight to some other number of points (e.g., 98 points 108 points, etc.) that may be a score used by the tournament. In other embodiments, such weights may be applied in the game themselves so that the games are configured to assign the number of points as winnings directly.

Figure 2:
FIG. 2 illustrates an example method that may be performed in some embodiments.

FIG. 2 illustrates an example method that may be performed in some embodiments. Such a method may be performed by a central system and/or one or more gaming devices to facilitate a tournament.

Some embodiments may include determining games for a tournament. Such a determination may include a random determination. Such a determination may include a picking by an administrator or sponsor through an administrative terminal. Such a determination may be done before a tournament begins. Such a determination may be done on an ongoing basis during a tournament. Such a determination may include one or some number of games at a time that change as the tournament progresses. Such a determination may include all games. It should be recognized that such a determination may take any desired form.

It should be recognized that various ways of determining games for the tournament may be combined as desired. For example, in some embodiments, every fifteen minutes, a new game for the tournament may be randomly determined. Players may be required to play that game to qualify for tournament points until another game is determined. As another example, some a sponsor may choose a particular game to be qualified for tournament play and/or a bonus weigh to play of that game in the tournament and other games that qualify may be randomly determined by a server such as 101.

Determining games may include determining game configuration and/or normalization weights in some embodiments. For example, some games may be determined to have a weight applied to their outcomes to make game play normalized across different game types. Various aspects may be used to normalize a game in any combination (e.g., expected value, number of winning outcomes, chance of winning outcome, average win per winning outcome, etc.).

Some embodiments may include determining players for the tournament. Such a determination may include determining players that pay a sign-up fee. Such a determination may include randomly selecting players that meet an eligibility requirement (e.g., are present in a location, are of age, have accounts with a gaming operator, and so on). For example, a server 101 may determine players that have signed up for the tournament through a mobile application on the players mobile devices 103. As another example, a server 101 may determine players that are playing in a gaming environment based on players that are signed into gaming machines 103. Those players may be eligible for a tournament in response to such a determination. Players may be notified of their entry into a tournament by transmitting information to the players (e.g., though a device 103, over an intercom, and so on). Players may be determined before a tournament begins, after a tournament begins, during a tournament, on an ongoing basis, and so on. For example, in some embodiments, all players for a tournament may be determined based on who signed up for the tournament before the tournament starts. As another example, players for a tournament may be allowed to sign up even after others have finished the tournament. A player may start play in the tournament at a time they choose. Accordingly players may play in a tournament at different times.

Some embodiments may include allowing play of the games in the tournament. Such allowing may include offering a wager through a sports wagering interface, offering a game through a gaming interface, and so on. Such allowing may include providing game outcomes to game devices. Such allowing may include including an option in an interface to have a game included in the tournament. Such allowing may include monitoring play of the games for use in determining an outcome of the tournament. A user may operate an interface of a gaming device to play an offered game by selecting a game (e.g., selecting to place a wager on a sporting event) and operating controls to place a bet or otherwise play the selected game. Allowing may include constantly allowing the same games and/or adjusting the games as the tournament progresses. Allowing may include allowing with restrictions such as only a number of times at least a number of times, and so on. A server 101 may facilitate such allowing by transmitting and/or receiving display information, outcome information and so on with a user device 103.

Some embodiments may include determining an effect on a tournament from play of the games in the tournament. For example, a central system (e.g., 101) may receive information identifying bet parameters (e.g., sides, amounts, odds, outcomes, etc.) based on such information a determination of winnings may be made (e.g., from a device 103). Each player in the tournament may win some amount by playing the games (e.g. winning a game in the tournament). That won amount may be tracked for each player over a duration of a tournament. It should be recognized that the amount won may refer to an actual amount won and/or some normalized amount won based on weighting of game outcome (these may or may not be the same thing depending on how and when a weighting may be applied to outcomes).

Some embodiments may include determining a winner of the tournament based on the play of the games. For example, a player that won (most money, points, number of games, jackpots, etc.) the most may be determined to be a winner by a central system. Various other players may be winners. For example, a player that loses the most may be a consolation winner. A player that has the biggest single loss may be some form of winner. A player that wins the single largest win may be considered a winner. A player that wins the second third, fourth, and so on amount may be considered a winner.

Some embodiments may include awarding a prize to a winner. Various forms of winners may earn a prize associated with winning. For example, a tournament overall highest scorer may win a jackpot prize. That prize may be transferred into an account of the player that is maintained and/or otherwise accessible by the central system. Awarding a prize may include transferring money into an account of a player that wins a tournament.

It should be recognized that various examples and discussion with respect to FIG. 1, FIG. 2, and other described embodiments are given as non-limiting examples only. Various embodiments may operate together in any desired combination. No described functionality and/or elements are necessary and other embodiments may include other, different, same and so on elements and/or functions.

An example embodiment may include a plurality of sports wagers being offered as part of a tournament. The wagers may relate to event happenings. For example, the wagers may relate to entire game outcomes, fantasy game outcomes, in running events and so on. A player may compete in a tournament related to such wagers. For example, a set of full game wagers (in a single sport, in multiple sports) over a weekend may be offered. Players may compete by playing those offered games. As another example, a set of in run events (e.g., will the batter hit the ball, will the play be a run or pass, will a first down be achieved in this possession, etc.) may be offered over the course of a game. Those offering may change as the game progresses and be part of a tournament. A player may compete by participating in those games over the course of a game, an inning, a weekend, and/or any other duration that a tournament may be run. Although examples are given in terms of sports, other embodiments may include other events such as any competition (e.g., an election, a television show like American Idol, and so on).

As further examples, some embodiments may include casino games such as card games, slot games, and so on. Further games may include games played through a mobile device. Such games may include video games, sports games, casino games, head to head games, and so on. Although some embodiments are given in terms of wagering, it should be recognized that such an element is not necessary. For example, in some embodiments players may play games that have accumulation without a risk. For example, video games may operate in such a manner-players risk no amount to play but accumulate points through action in the games. Although some embodiments are given in terms of wagering a chosen amount, some embodiments that include wagering may include a fix wager amount. Such a fixed amount may focus the tournament on a ability to play more games well rather than risk a large amount at a right time.

It should be recognized that these examples are given as non-limiting examples only and that they may be combined and/or altered in any manner (e.g., a fixed wager amount in run sports games being offered with variable wager amount video games for a tournament that last over a weekend).

Figure 3:
FIG. 3 illustrates an example tournament designer interface that may be used in some embodiments.

Some embodiments may include a utility to facilitate the formation of a tournament by an administrator. FIG. 3 illustrates an examples of an interface that may be used to facilitate such a formation. An administrator may operate controls to enter properties about the tournament (e.g., time of start, number of games, time of end, number of participants, prize, buy in amount, whether or not the games should be weighted, how to weight the games, and so on). An administrator may enter information about the tournament parameters to define aspects of the tournament. A computing device may accept such information and use it to define a tournament (e.g., such as system 101).

An administrator may be presented with a list of available games. An administrator may select games to add to the tournament. For each game a device may receive the selection and present selected game properties to the administrator. The administrator may adjust game properties to configure a game for the tournament. For example, a list of possible game outcomes may be presented to the administrator by transmitting such information to a display device form a computing device (e.g., 101). An administrator may select the outcomes that are winning outcomes. The administrator may adjust the chance of each winning outcome and/or an amount won for getting that winning outcome. These are given as example parameters only and other embodiments may include other desired parameters.

Based on selected parameters of a game, a computer device may determine a normalization weight for a game. Such a eight may be transmitted to a display for display to the administrator (e.g., by server 101). For example, a tournament parameter may indicate that games should be normalized to establish a same expected vale of game play, a same average amount won per win, a same chance of a win, and/or any other desired item to normalize. Based on that expressed desire and the game parameters selected, a determination may be made as to how to weigh the game to achieve the desired normalization. For example, if a determination is made that games should have an expected return of 94 cents per dollar and a game as configured by an administrator has an expected return of 95 cents per dollar, a normalization weighting of 94/95 may be applied to the game.

An administrator may add each game as configured to a set of games for a tournament by pressing an add to tournament button. A computing device may record the added games and cause a list of added games to be presented. An administrator may select games form that list to add, adjust or remove those games.

When an administrator has added the desired games, the administrator may enable the tournament by pressing an enable tournament button. A computing device (e.g., 101) may receive an indication of the configured tournament in response and may facilitate play of the tournament by players in accordance with the configuration (e.g., such as by performing a method like that of FIG. 2).

Although an example is given in terms of a normalization as adding of games is performed, it should be recognized that such a normalization may occur after games are added. For example, after the list of games are added, if a normalization based on some characteristic is desired, then the computing device may apply a weighting to the games that brings them to the desired normal after all the games are added to the list of desired games.

Although examples are given in terms of a sever 101 taking actions for he interface of FIG. 3, it should be recognized that any device my perform such actions. A sever 101 or other device governing a tournament may receive information established through such an interface and take actions such as those of FIG. 2 to facilitate a tournament according to the defined information.

The following sections provide a guide to interpreting the present application.

II. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not necessarily limited to", unless expressly specified otherwise. Thus, for example, the sentence "the portfolio includes a red widget and a blue widget" means the portfolio includes the red widget and the blue widget, but may include something else.

The term "consisting of" and variations thereof means "including and limited to", unless expressly specified otherwise. Thus, for example, the sentence "the portfolio consists of a red widget and a blue widget" means the portfolio includes the red widget and the blue widget, but does not include anything else.

The term "compose" and variations thereof means "to make up the constituent parts of, component of or member of", unless expressly specified otherwise. Thus, for example, the sentence "the red widget and the blue widget compose a portfolio" means the portfolio includes the red widget and the blue widget.

The term "exclusively compose" and variations thereof means "to make up exclusively the constituent parts of, to be the only components of or to be the only members of", unless expressly specified otherwise. Thus, for example, the sentence "the red widget and the blue widget exclusively compose a portfolio" means the portfolio consists of the red widget and the blue widget, and nothing else.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" does not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

III. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

IV. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

V. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s), is to be used in interpreting the meaning of any claim or is to be used in limiting the scope of any claim. An Abstract has been included in this application merely because an Abstract is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not include features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

All disclosed embodiment are not necessarily covered by the claims (even including all pending, amended, issued and canceled claims). In addition, an embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

VI. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing/multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VII. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

IX. Disclaimer

Numerous references to a particular embodiment do not indicate a disclaimer or disavowal of additional, different embodiments, and similarly references to the description of embodiments which all include a particular feature do not indicate a disclaimer or disavowal of embodiments which do not include that particular feature. A clear disclaimer or disavowal in the present application shall be prefaced by the phrase "does not include" or by the phrase "cannot perform".

XI. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XX. Alternative Technologies

It will be understood that the technologies described herein for making, using, or practicing various embodiments are but a subset of the possible technologies that may be used for the same or similar purposes. The particular technologies described herein are not to be construed as limiting. Rather, various embodiments contemplate alternate technologies for making, using, or practicing various embodiments.

The invention claimed is:

1. An apparatus comprising:

a plurality of gaming systems;

one or more processors; and one or more non-transitory mediums having stored thereon instructions that when executed by the one or more processors cause the apparatus to:

determine a plurality of different game types to be available for play in a tournament by a plurality of players, in which the game types are offered at the plurality of gaming systems;

facilitate play of the plurality of different game types by the plurality of players as part of the tournament;

based on at least one of an expected return on each game type, an expected chance of a winning outcome in each game type, and an average win amount in each game type, determine a normalization factor for each game type;

track outcomes of the play of the plurality of different game types by the plurality of different players based on information received from the plurality of gaming systems, in which tracking outcomes includes applying a respective normalization factor to each outcome to normalize winnings from each game type;

based on the tracked outcomes, determine a winning player of the tournament from the plurality of players.

2. The apparatus of claim 1, in which the plurality of different game types include sports wagering and casino gaming.

3. The apparatus of claim 1, in which tracking outcomes includes:

for each winning game played as part of the tournament, receiving an indication of an outcome of the game and determining an amount of an increase in tournament points a player of the plurality of players.

4. The apparatus of claim 3, in which the amount includes an amount of money won by play of the game.

5. The apparatus of claim 3, in which determining the amount includes applying a normalization factor to the outcome.

6. The apparatus of claim 1, in which facilitating play includes at least one of: determining outcomes for the plurality of different game types, and adjusting an interface to allow selection of the different game types as part of the tournament.

7. The apparatus of claim 1, in which the apparatus is caused to receive an indication of a player logging in at each of a plurality of gaming devices, and based on each logging in, apply adjustments a score in the tournament from gameplay at the gaming devices to the player.

8. The apparatus of claim 7, in which the gaming devices include at least one of a slot machine, a mobile phone, and a sports book interface.

9. The apparatus of claim 1, in which the apparatus is caused to:

determine a winner of the tournament includes determining a player of the plurality of players that has a highest point total at an end of the tournament.

10. The apparatus of claim 1, in which determining the game types includes receiving a selection of the game types from an administrator.

11. The apparatus of claim 10, in which receiving the selection of game types includes receiving a selection of winning outcomes and a chance of each outcome occurring for each game type.

12. A method comprising:

determining, by a computing device, a plurality of different game types to be available for play in a tournament by a plurality of players, in which the plurality of different game types are offered at a plurality of gaming systems that are networked to the computing device;

facilitating, by the computing device, play of the plurality of different game types by the plurality of players as part of the tournament;

based on at least one of an expected return on each game type, an expected chance of a winning outcome in each game type, and an average win amount in each game type, determine a normalization factor for each game type;

tracking, by the computing device, outcomes of the play of the plurality of different game types by the plurality of different players received from the plurality of gaming systems, in which tracking outcomes includes applying a respective normalization factor to each outcome to normalize winnings from each game type;

based on the tracked outcomes, determining, by the computing device, a winning player of the tournament from the plurality of players.

13. The method of claim 12, in which the plurality of different game types include sports wagering and casino gaming.

14. The method of claim 12, in which tracking outcomes includes:

for each winning game played as part of the tournament, receiving an indication of an outcome of the game and determining an amount of an increase in tournament points a player of the plurality of players.

15. The method of claim 14, in which the amount includes an amount of money won by play of the game.

16. The method of claim 14, in which determining the amount includes applying a normalization factor to the outcome.

17. The method of claim 12, in which facilitating play includes at least one of: determining outcomes for the plurality of different game types, and adjusting an interface to allow selection of the different game types as part of the tournament.

18. The method of claim 12, comprising: receiving an indication of a player logging in at each of a plurality of gaming devices, and based on each logging in, applying adjustments a score in the tournament from gameplay at the gaming devices to the player.

19. The method of claim 18, in which the gaming devices include at least one of a slot machine, a mobile phone, and a sports book interface.

20. The method of claim 12, comprising:

determining a winner of the tournament includes determining a player of the plurality of players that has a highest point total at an end of the tournament.

21. The method of claim 12, in which determining the game types includes receiving a selection of the game types from an administrator.

22. The method of claim 21, in which receiving the selection of game types includes receiving a selection of winning outcomes and a chance of each outcome occurring for each game type.

* * * * *